United States Patent
Okamoto et al.

(10) Patent No.: US 9,813,170 B2
(45) Date of Patent: Nov. 7, 2017

(54) IN-VEHICLE TERMINAL THAT MEASURES ELECTRIC FIELD STRENGTHS OF RADIO WAVES FROM INFORMATION TERMINALS

(71) Applicant: Clarion Co., Ltd., Saitama-shi, Saitama (JP)

(72) Inventors: Kimio Okamoto, Yokohama (JP); Noriyuki Abe, Yokohama (JP); Yusuke Matsumoto, Saitama (JP); Tetsuya Yamada, Chigasaki (JP); Takuya Fujieda, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 15/205,409

(22) Filed: Jul. 8, 2016

(65) Prior Publication Data

US 2017/0012721 A1    Jan. 12, 2017

(30) Foreign Application Priority Data

Jul. 9, 2015    (JP) .................................. 2015-137691

(51) Int. Cl.
*H04B 17/00*    (2015.01)
*H04B 17/318*    (2015.01)
(Continued)

(52) U.S. Cl.
CPC ........... *H04B 17/318* (2015.01); *B60N 2/002* (2013.01); *B60R 16/037* (2013.01);
(Continued)

(58) Field of Classification Search
CPC ..... H04W 4/046; H04W 84/18; H04W 8/005; H04W 4/008; H04W 4/02; H04W 4/023;
(Continued)

(56) References Cited

U.S. PATENT DOCUMENTS

2007/0232345 A1    10/2007   Taoka
2008/0077261 A1*   3/2008    Baudino ................ H04H 20/63
                                                          700/94
(Continued)

FOREIGN PATENT DOCUMENTS

DE    10 2013 201 959 A1    8/2014
JP         2003-248045 A    9/2003
(Continued)

OTHER PUBLICATIONS

European Search Report issued in counterpart European Application No. 16178639.7 dated Nov. 30, 2016 (11 pages).

*Primary Examiner* — Golam Sorowar
(74) *Attorney, Agent, or Firm* — Crowell & Moring LLP

(57) ABSTRACT

An in-vehicle terminal includes: a measurement unit that measures electric field strengths of radio waves for wireless communication emitted from information terminals located in a vicinity thereof; a main terminal identifying unit that identifies a predetermined main terminal among the information terminals; and a communication unit that establishes wireless communication with the identified main terminal and transmits a first electric field strength for another information terminal than the main terminal measured by the measurement unit, via the wireless communication to the main terminal.

6 Claims, 11 Drawing Sheets

(51) Int. Cl.
  H04L 29/08 (2006.01)
  B60N 2/00 (2006.01)
  B60R 16/037 (2006.01)
  H04W 4/02 (2009.01)
  H04W 4/04 (2009.01)
(52) U.S. Cl.
  CPC ............ H04L 67/306 (2013.01); H04L 67/34 (2013.01); H04W 4/023 (2013.01); H04W 4/046 (2013.01)
(58) Field of Classification Search
  CPC ....... H04W 4/06; H04W 40/02; H04W 40/22; H04W 40/244; H04W 40/248; H04W 40/28; H04M 1/6091; H04M 1/6075; H04M 1/67; H04M 1/72522; H04M 1/72577; H04M 2250/02
  See application file for complete search history.

(56) References Cited

U.S. PATENT DOCUMENTS

| | | | |
|---|---|---|---|
| 2008/0085702 A1* | 4/2008 | Park | H04W 40/28 455/422.1 |
| 2009/0088164 A1* | 4/2009 | Shen | H04B 7/155 455/436 |
| 2011/0195699 A1 | 8/2011 | Tadayon et al. | |
| 2011/0237186 A1 | 9/2011 | Preissinger et al. | |
| 2011/0300843 A1* | 12/2011 | Miller | H04M 1/6075 455/418 |
| 2013/0198802 A1 | 8/2013 | Ricci | |
| 2014/0195102 A1* | 7/2014 | Nathanson | G07C 5/0808 701/31.4 |
| 2015/0009856 A1* | 1/2015 | Shu | H04W 4/02 370/252 |
| 2015/0057839 A1 | 2/2015 | Chang et al. | |
| 2015/0149042 A1 | 5/2015 | Cooper et al. | |
| 2016/0150066 A1* | 5/2016 | Yae | H04W 4/008 455/41.2 |

FOREIGN PATENT DOCUMENTS

| | | |
|---|---|---|
| JP | 2004-297201 A | 10/2004 |
| JP | 2012-132821 A | 7/2012 |
| JP | 2013-50325 A | 3/2013 |
| JP | 2014-225209 A | 12/2014 |
| WO | WO 2006/001140 A1 | 1/2006 |
| WO | WO 2014/160684 A1 | 10/2014 |

* cited by examiner

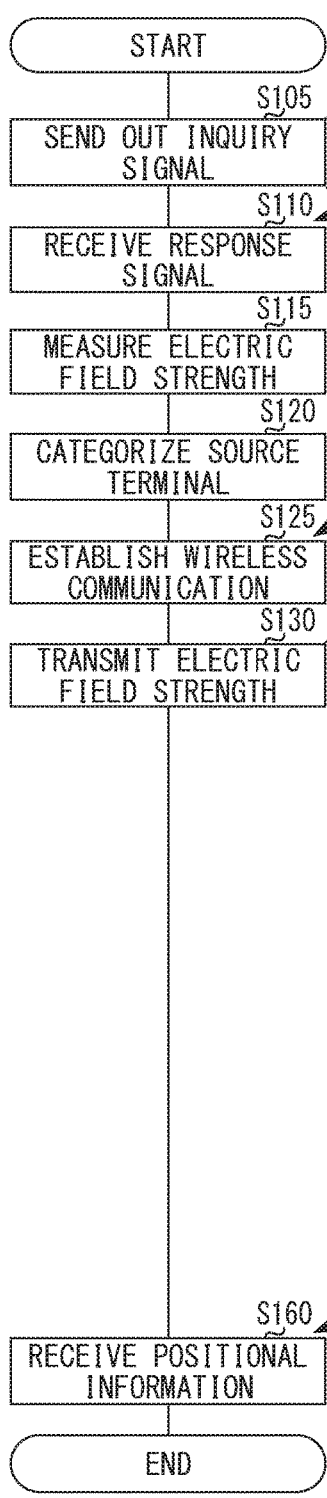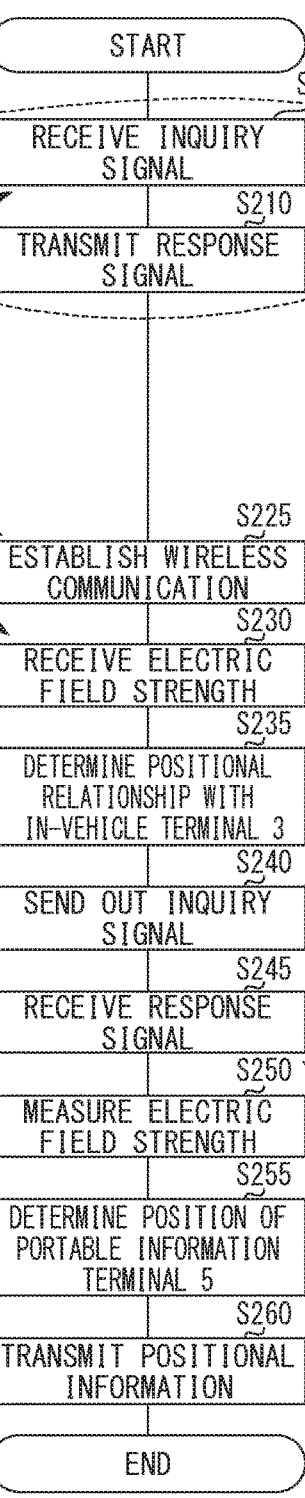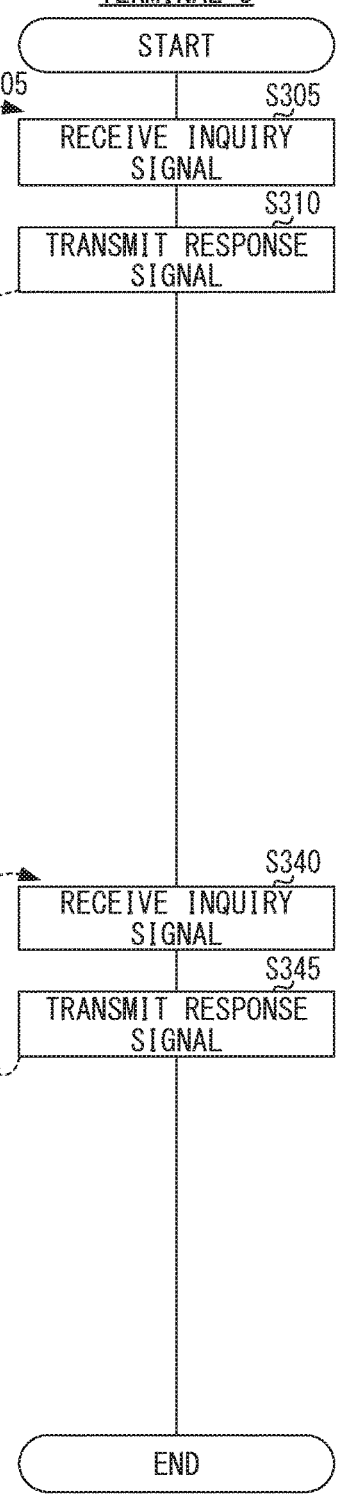

IN-VEHICLE TERMINAL THAT MEASURES ELECTRIC FIELD STRENGTHS OF RADIO WAVES FROM INFORMATION TERMINALS

INCORPORATION BY REFERENCE

The disclosure of the following priority application is herein incorporated by reference: Japanese Patent Application No. 2015-137691 filed Jul. 9, 2015

BACKGROUND OF THE INVENTION

1. Field of the Invention

The present invention relates to an in-vehicle terminal and a program.

2. Description of Related Art

Japanese Laid-Open Patent Publication No. 2012-132821 discloses an in-vehicle device that identifies a driver and passengers from mobile phones that the occupants of a vehicle own.

SUMMARY OF THE INVENTION

According to the device described in the above-described patent publication, positions of occupants cannot be detected, although it can be detected whether the occupants are present or not.

An in-vehicle terminal according to a first aspect of the present invention, comprises: a measurement unit that measures electric field strengths of radio waves for wireless communication emitted from information terminals located in a vicinity thereof a main terminal identifying unit that identifies a predetermined main terminal among the information terminals; and a communication unit that establishes wireless communication with the identified main terminal and transmits a first electric field strength for another information terminal than the main terminal measured by the measurement unit, via the wireless communication to the main terminal.

According to a second aspect of the present invention, in the in-vehicle terminal according to the first aspect, it is preferable that the measurement unit measures an electric field strength of a radio wave emitted from the main terminal when the communication unit establishes the wireless communication.

According to a third aspect of the present invention, in the in-vehicle terminal according to the second aspect, it is preferable that the communication unit transmits a second electric field strength for the main terminal measured by measurement unit, via the wireless communication to the main terminal.

According to a fourth aspect of the present invention, in the in-vehicle terminal according to the third aspect, it is preferable that the communication unit receives positional information of the other information terminal calculated by the main terminal, from the main terminal via the wireless communication.

According to a fifth aspect of the present invention, the in-vehicle terminal according to the fourth aspect may further comprise: a display unit that displays a position of the other information terminal, based on the positional information of the other information terminal received by the communication unit.

An in-vehicle terminal according to a sixth aspect of the present invention comprises: a measurement unit that measures electric field strengths of radio waves for wireless communication emitted from information terminals located in a vicinity thereof; a main terminal identifying unit that identifies a predetermined main terminal among the information terminals; a keeping unit that keeps a first electric field strength for another portable information terminal than the identified main terminal measured by the measurement unit; and a communication unit that establishes wireless communication with the main terminal and receives a second electric field strength for the other information terminal measured by the main terminal, from the main terminal via the wireless communication.

According to a seventh aspect of the present invention, in the in-vehicle terminal according to the sixth aspect, it is preferable that the measurement unit measures an electric field strength of a radio wave emitted from the main terminal when the communication unit establishes the wireless communication.

According to an eighth aspect of the present invention, in the in-vehicle terminal according to the seventh aspect, it is preferable that the keeping unit further keeps a third electric field strength for the main terminal measured by the measurement unit; and the in-vehicle terminal further comprises: a position determining unit that determines a positional relationship between the in-vehicle terminal and the main terminal based on the third electric field strength.

According to a ninth aspect of the present invention, in the in-vehicle terminal according to the eighth aspect, it is preferable that the position determining unit further determines a position of the other information terminal based on the positional relationship, the first electric field strength, and the second electric field strength.

According to a tenth aspect of the present invention, in the in-vehicle terminal according to the ninth aspect, it is preferable that if there are a plurality of candidates for the position of the other information terminal determined based on the positional relationship, the first electric field strength, and the second electric field strength, the position determining unit determines the position of the other information terminal by excluding candidates that are present out of a predetermined range.

According to an 11th aspect of the present invention, the in-vehicle terminal according to the tenth aspect may further comprise: a display unit that displays the position of the other information terminal determined by the position determining unit.

In a computer-readable computer program product having a program to be executed by a computer according to a 12th aspect of the present invention, the program comprises: a measuring step of measuring electric field strengths of radio waves for wireless communication emitted from information terminals located in a vicinity thereof; a main terminal identifying step of identifying a predetermined main terminal among the information terminals; and a communication step of establishing wireless communication with the identified main terminal and transmitting a first electric field strength for another information terminal than the main terminal measured in the measuring step, via the wireless communication to the main terminal.

In a 13th aspect of the present invention, in the computer program product according to the 12th aspect, it is preferable that in the measuring step, an electric field strength of a radio wave emitted from the main terminal is measured when establishing the wireless communication.

In a 14th aspect of the present invention, in the computer program product according to the 13th aspect, it is preferable that in the communication step, a second electric field strength for the main terminal measured by the measuring step is transmitted via the wireless communication to the main terminal, in addition to the first electric field strength.

In a 15th aspect of the present invention, in the computer program product according to the 14th aspect, it is preferable that in the communication step, positional information of the other information terminal calculated by the main terminal is received from the main terminal via the wireless communication.

In a 16th aspect of the present invention, in the computer program product according to the 15th aspect, it is preferable that the program further comprises a display step of displaying a position of the other information terminal on the display device, based on the positional information of the other information terminal received in the communication step.

In a computer-readable computer program product having a program to be executed by a computer according to a 17th aspect of the present invention, the program comprises: a measuring step of measuring electric field strengths of radio waves for wireless communication emitted from information terminals located in a vicinity thereof; a main terminal identifying step of identifying a predetermined main terminal among the information terminals; a keeping step of keeping a first electric field strength for another portable information terminal than the identified main terminal measured in the measuring step; and a communication step of establishing wireless communication with the main terminal and receiving a second electric field strength for the other information terminal measured by the main terminal, from the main terminal via the wireless communication.

According to an 18th aspect of the present invention, in the computer program product according to the 17th aspect, it is preferable that in the measuring step, an electric field strength of a radio wave emitted from the main terminal is measured when establishing the wireless communication.

According to a 19th aspect of the present invention, in the computer program product according to the 18th aspect, it is preferable that in the keeping step, a third electric field strength for the main terminal measured by the measuring step is further kept; and the program further comprises a position determining step of determining a positional relationship between an in-vehicle terminal and the main terminal based on the third electric field strength.

According to a 20th aspect of the present invention, in the computer program product according to the 19th aspect, it is preferable that in the position determining step, a position of the other information terminal is determined based on the positional relationship, the first electric field strength, and the second electric field strength.

According to a 21st aspect of the present invention, in the computer program product according to the 20th aspect, it is preferable that in the position determining step, if there are a plurality of candidates for the position of the other information terminal determined based on the positional relationship, the first electric field strength, and the second electric field strength, the position of the other information terminal is determined by excluding candidates that are present out of a predetermined range.

According to a 22nd aspect of the present invention, in the computer program product according to the 21st aspect, it is preferable that the program further comprises a display step of displaying the position of the other information terminal determined in the position determining step on a display device.

BRIEF DESCRIPTION OF THE DRAWINGS

FIGS. 7A to 7C are flowcharts of a terminal position determining process.

DESCRIPTION OF EMBODIMENTS

First Embodiment

Figure 1:
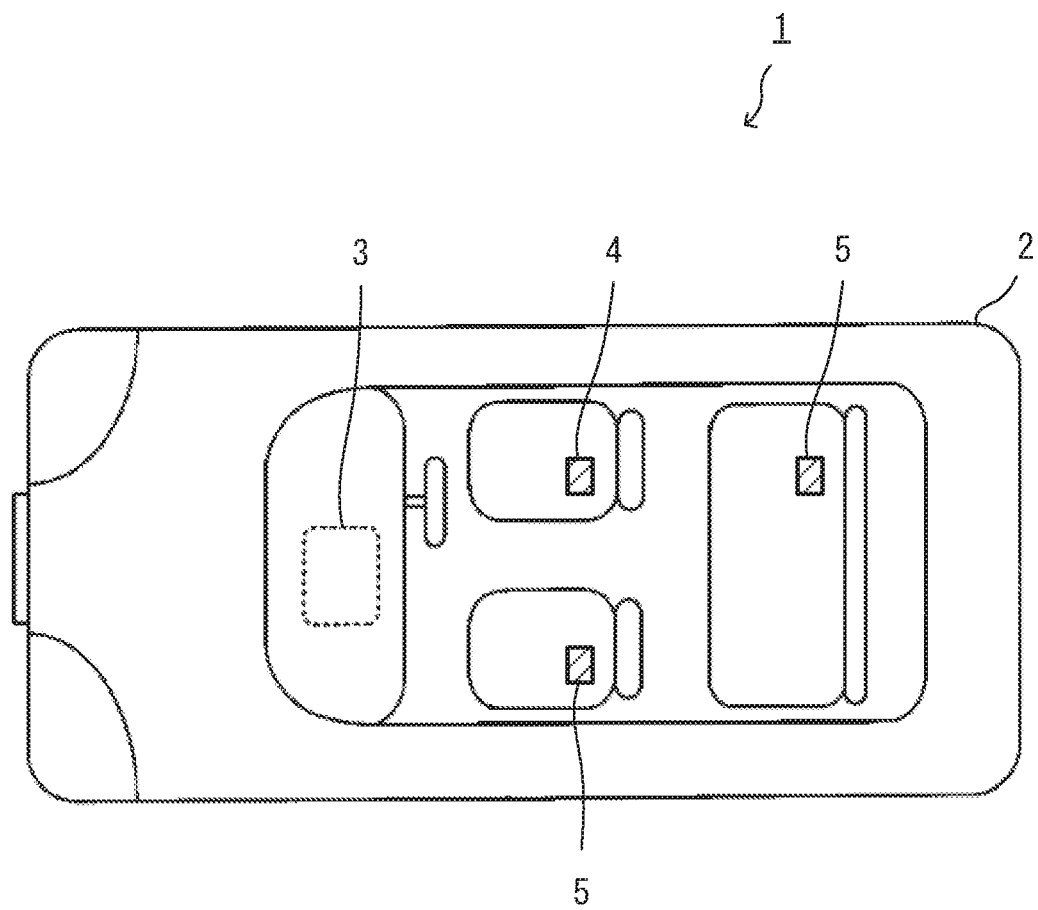
FIG. 1 is a block diagram schematically showing an in-vehicle system according to a first embodiment.

FIG. 1 is a block diagram schematically showing an in-vehicle system according to a first embodiment. The in-vehicle system 1 includes an in-vehicle terminal 3 mounted in a vehicle 2, and a portable information terminal 4 that a driver of the vehicle 2 owns. Among occupants of the vehicle 2, occupants other than the driver will be referred to as passengers in the following description.

The in-vehicle system 1 recognizes occupants who carry portable information terminals, by detecting the portable information terminals. The in-vehicle system 1 includes an occupant database (as described hereinafter) that associates portable information terminals with occupants. The in-vehicle system 1 retrieves the detected portable information terminals from the occupant database to identify corresponding occupants.

In the following description, the portable information terminal 4 that the driver owns will be referred to as a main terminal 4 and distinguished from portable information terminals 5 that passengers own.

Figure 2:
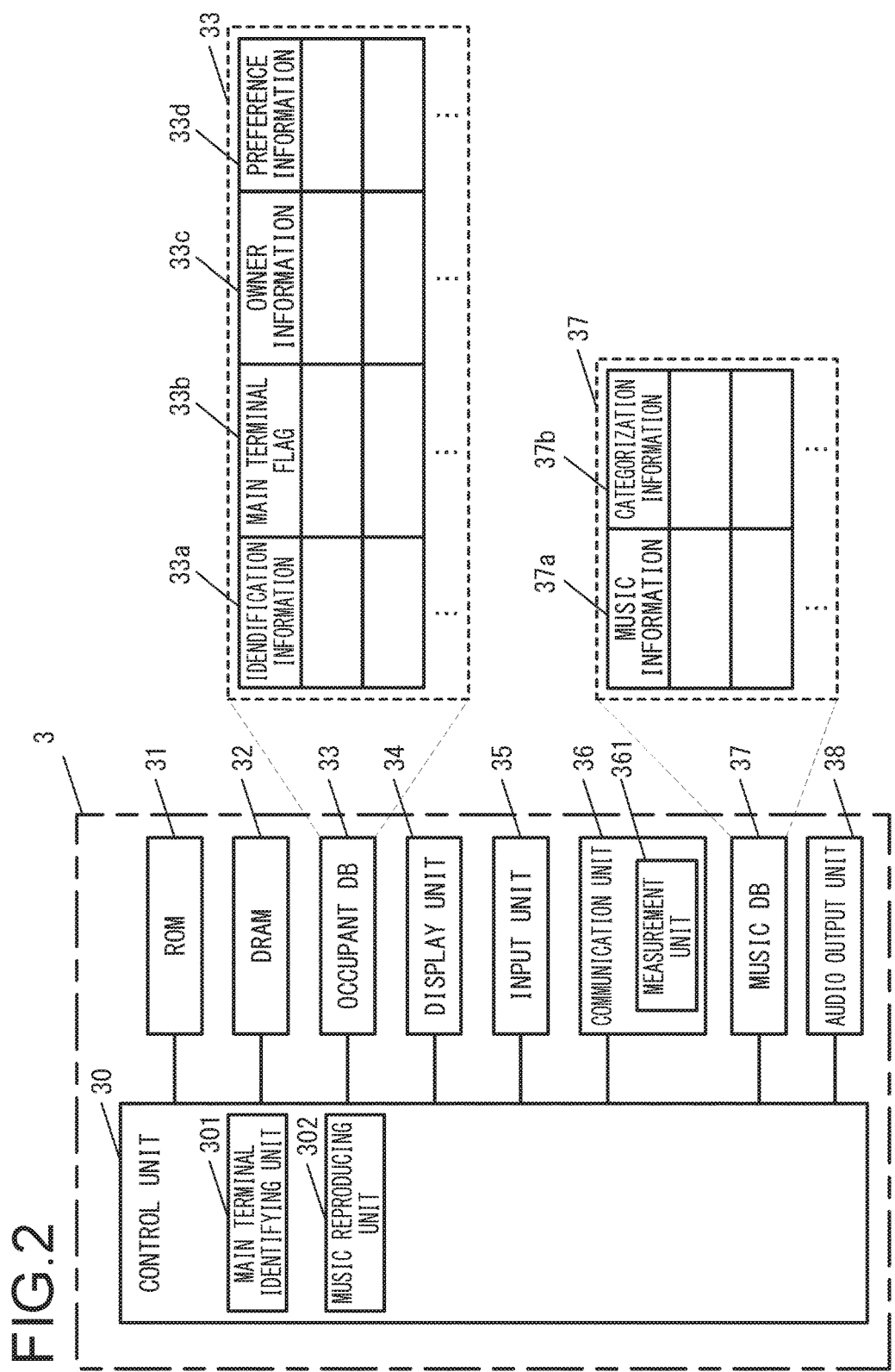
FIG. 2 is a block diagram schematically showing a configuration of an in-vehicle terminal.

FIG. 2 is a block diagram schematically showing a configuration of the in-vehicle terminal 3. The in-vehicle terminal 3 includes a control unit 30, a ROM 31, a DRAM 32, an occupant database (DB) 33, a display unit 34, an input unit 35, a communication unit 36, a music DB 37, and an audio output unit 38.

The control unit 30 is composed of a CPU (not shown) and its peripheral circuits. The ROM 31 is a nonvolatile storage medium. A predetermined control program has been stored in advance in the ROM 31. The control unit 30 controls the in-vehicle terminal 3 by reading the control program from the ROM 31 and executing the control program. The DRAM 32 is a temporary storage medium. The control unit 30 utilizes the DRAM 32 as a working storage area.

The occupant DB 33 is a database that stores occupants who own portable information terminals. As schematically shown in FIG. 2, the occupant DB 33 stores one or more identification information 33a, main terminal flags 33b, owner information 33c, and preference information 33d in such a manner that they are associated to one another. The identification information 33a is information indicating a Bluetooth (™) Device Address (BD_ADDR) of a portable information terminal. Here, the identification information 33a is only required to be information indicating an unique identifier for each portable information terminal and may be different information from the BD_ADDR. The main terminal flag 33b is information indicating whether the respective portable information terminal is the main terminal 4 or not. The owner information 33c is information indicating an owner of the respective portable information terminal. The preference information 33d is information indicating a music genre matched with the preference of the owner of the respective portable information terminal.

The display unit 34 is a display device such as a liquid crystal monitor, for example. The control unit 30 displays a variety of images and texts on the display unit 34. The input unit 35 is an input device such as a touch panel, for example. The communication unit 36 wirelessly communicates with the main terminal 4 and the portable information terminals 5. The communication unit 36 is a communication module that complies with the Bluetooth standard, for example. The communication unit 36 has a measurement unit 361. The measurement unit 361 measures electric field strengths of radio waves sent out from the main terminal 4 and the portable information terminals 5 located in the vicinity thereof before the wireless communication.

The music DB 37 is a database in which a plurality of music data are stored. As schematically shown in FIG. 2, the music DB 37 stores a plurality of music information 37a and category information 37b in such a manner that they are associated with each other. The music information 37a is digital music data. The category information 37b is information indicating genres to which the respective music information 37a belongs. Each music information 37a belongs to one or more genres.

The control unit 30 has a main terminal identifying unit 301 and a music reproducing unit 302. The main terminal identifying unit 301 and the music reproducing unit 302 are functional units in the form of software whose functions are achieved by the control unit 30 executing the control program. It will be noted that each of these functional units may be composed of electronic circuits.

The main terminal identifying unit 301 identifies the main terminal 4 from portable information terminals located in the vicinity thereof (as described hereinafter in detail). The music reproducing unit 302 outputs audio signals produced from the music information 37a to the audio output unit 38. The audio output unit 38 is connected to a speaker (not shown) or the like. In other words, the music reproducing unit 302 reproduces the music information 37a by means of the speaker (not shown) or the like.

Figure 3:
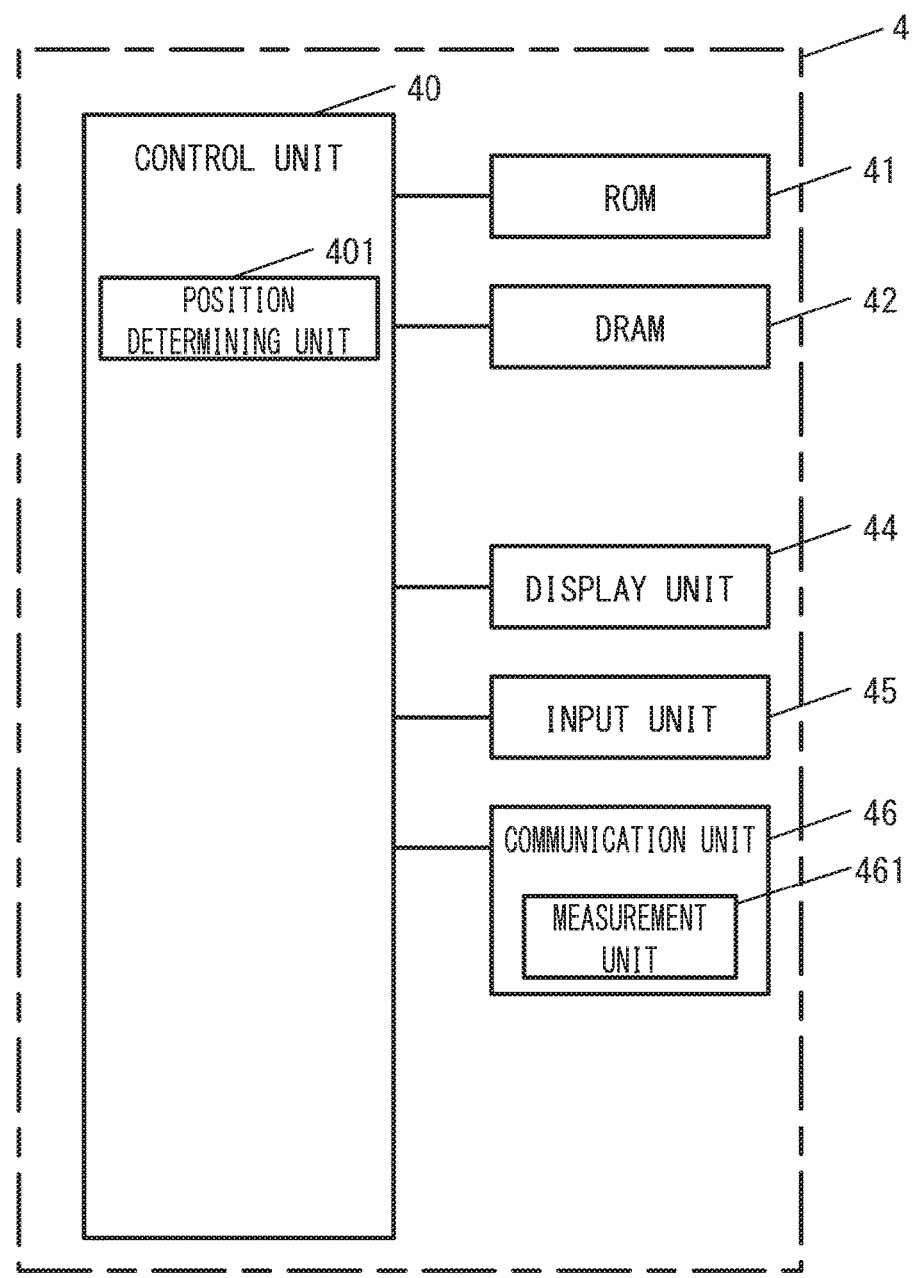
FIG. 3 is a block diagram schematically showing a configuration of a main terminal.

FIG. 3 is a block diagram schematically showing a configuration of the main terminal 4. The main terminal 4 includes a control unit 40, a ROM 41, a DRAM 42, a display unit 44, an input unit 45, and a communication unit 46.

The control unit 40 is composed of a CPU (not shown) and its peripheral circuits. The ROM 41 is an nonvolatile storage medium. A predetermined control program has been stored in advance in the ROM 41. The control unit 40 controls the main terminal 4 by reading the control program from the ROM 41 and executing the control program. The DRAM 42 is a temporary storage medium. The control unit 40 utilizes the DRAM 42 as a working storage area.

The display unit 44 is a display device such as a liquid crystal monitor, for example. The control unit 40 displays a variety of images and texts on the display unit 44. The input unit 45 is an input device such as a touch panel, for example.

The communication unit 46 wirelessly communicates with the in-vehicle terminal 3 and the portable information terminals 5. The communication unit 46 is a communication module that complies with the Bluetooth standard, for example. The communication unit 46 has a measurement unit 461. The measurement unit 461 measures electric field strengths of radio waves sent out from the in-vehicle terminal 3 and the portable information terminals 5 located in the vicinity thereof, before the wireless communication.

The control unit 40 has a position determining unit 401. The position determining unit 401 is a functional unit in the form of software whose function is achieved by the control unit 40 executing the control program. The position determining unit 401 determines a positional relationship between the in-vehicle terminal 3, the main terminal 4, and the portable information terminals 5 (as described hereinafter in detail).

(Explanation of Method for Registration into Occupant DB 33)

As described above, the occupant DB 33 stores information about an owner for each portable information terminal (owner information 33c) and information about a preference of the respective owner (preference information 33d). First, the information about the main terminal 4 is stored at the initial setting time of the in-vehicle system 1, for example. If the Bluetooth is used as a communication scheme, the initial setting is a so-called pairing process. The information about the portable information terminals 5 other than the main terminal 4 is manually registered by the driver who carries the main terminal 4. A specific registration procedure will be described below.

At a predetermined timing, such as when the in-vehicle terminal 3 is powered on, the position determining unit 401 of the main terminal 4 determines positions of the portable information terminals 5 located in the vicinity thereof (as described hereinafter in detail). The control unit 40 of the main terminal 4 transmits the identification information 33a of the portable information terminals 5 located in the vicinity thereof and the positions of the portable information terminals 5 determined by the position determining unit 401 to the in-vehicle terminal 3.

For each received identification information 33a, the control unit 30 of the in-vehicle terminal 3 determines whether the identification information 33a is included in the occupant DB 33 or not. In other words, the control unit 30 determines whether the portable information terminal 5 identified by the identification information 33a has already been registered or not. On the basis of this determination result, the control unit 30 displays the position of the portable information terminal 5 on the display unit 34.

Figure 4:
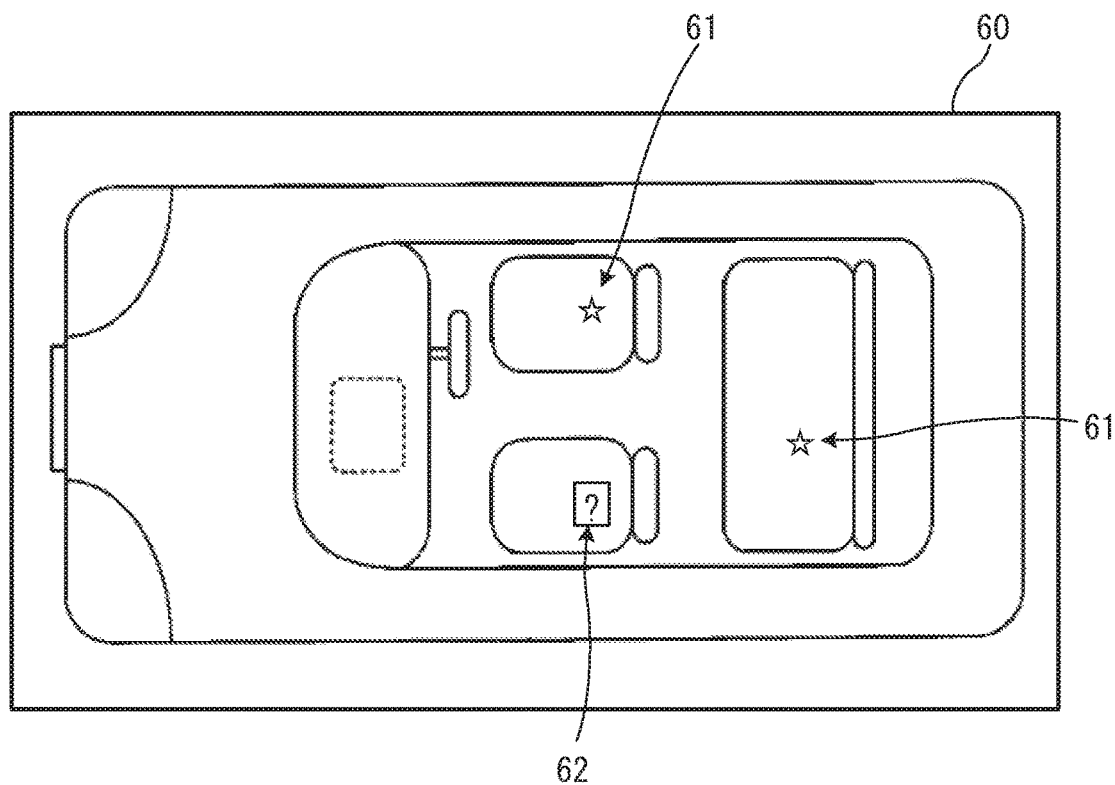
FIG. 4 is an example of a screen that displays positions of portable information terminals.

FIG. 4 is an example of a screen image that displays the positions of the portable information terminals 5. The control unit 30 displays an image 60 schematically representing a vehicle interior of the vehicle 2 on the display unit 34. The control unit 30 displays registered-terminal icons 61 indicating positions of the main terminal 4 and portable information terminals 5 that have already been registered in the occupant DB 33, and unregistered-terminal icons 62 indicating portable information terminals 5 that has not been registered in the occupant DB 33, in such a manner that they are superimposed on the image 60. It will be noted that the main terminal 4 and the registered portable information terminals 5 may be displayed by different icons to each other.

For the unregistered-terminal icon 62 displayed on the display unit 34, the driver can perform a registration operation of registering the portable information terminal 5 corresponding to the unregistered-terminal icon 62 to the occupant DB 33. For example, the driver touches the unregistered-terminal icon 62 via the input unit 35, which is a touch panel. In response to this operation, the control unit 30 displays an input box or the like for input of information about the portable information terminal 5 corresponding to the unregistered-terminal icon 62 touched by the driver, on the display unit 34.

The driver inputs the owner information 33c and the preference information 33d in the displayed input box or the like. The control unit 30 associates the identification information 33a of the portable information terminal 5 corresponding to the unregistered-terminal icon 62 touched by the driver with the owner information 33c and the preference information 33d which are here input, and then stores (registers) the information in the occupant DB 33. It will be noted that since the portable information terminal 5 that is newly registered here is not the main terminal 4, the control unit 30 stores the portable information terminal 5 with its main terminal flag 33b of 0 in the occupant DB 33.

After the registration is completed, the control unit 30 changes the unregistered-terminal icon 62 that has been displayed on the display unit 34 into an registered-terminal icon 61.

(Explanation of Music Reproducing Feature)

A music reproducing feature that the in-vehicle system 1 has will be described. The music reproducing unit 302 selects and reproduces music information 37a matched with the preferences of the occupants of the vehicle 2 from a large number of music information 37a stored in the music DB 37. For example, when the driver instructs the in-vehicle terminal 3 to reproduce music via the input unit 35 or the like, the music reproducing unit 302 executes a music reproducing process. The music reproducing process will now be described in detail.

The music reproducing unit 302 retrieves the identification information 33a of the main terminal 4 and the portable information terminals that are present in the vehicle 2, from the occupant DB 33. If the identification information 33a has been registered in the occupant DB 33, the music reproducing unit 302 reads out corresponding preference information 33d from the occupant DB 33.

The music reproducing unit 302 retrieves music information 37a associated with category information 37b that includes at least one of genres included in the read-out preference information 33d, from the music DB 37. For example, if the read-out preference information 33d includes two genres, "pop" and "rock", the music reproducing unit 302 retrieves music information 37a having its corresponding category information 37b that includes at least one of "pop" and "rock".

It will be noted that if a plurality of preference information 33d are read out from the occupant DB 33, the music reproducing unit 302 retrieves the music information 37a from the preference information 33d on the basis of an union of genres included in the plurality of preference information 33d. In other words, the music reproducing unit 302 retrieves music information 37a associated with category information 37b that includes at least one of genres included in either one of the plurality of preference information 33d.

The music reproducing unit 302 selects and reproduces one arbitrary music information 37a, among the music information 37a included in the retrieval result. It will be noted that if the identification information 33a of a portable information terminal 5 that is present in the vehicle 2 is not included in the occupant DB 33, the music reproducing unit 302 ignores this portable information terminal 5.

In the way described above, the music reproducing unit 302 selects and reproduces the music information 37a belonging to the genres matched with the preferences of the occupants from a large number of music information 37a.

(Method of Determining Position of Portable Information Terminal 5)

A method of determining a position of a portable information terminal 5 by means of the in-vehicle system 1 will be described. At a predetermined timing, such as when the in-vehicle terminal 3 is powered on, the in-vehicle terminal 3 and the main terminal 4 execute a terminal position determining process as described below in detail. As described before, when a portable information terminal 5 is registered into the occupant DB 33, the control unit 30 of the in-vehicle terminal 3 displays the position of the portable information terminal 5 determined by the terminal position determining process on the display unit 34.

The terminal position determining process is started by the control unit 30 of the in-vehicle terminal 3. The control unit 30 causes the communication unit 36 to detect portable information terminals located in the vicinity thereof. The communication unit 36 performs a Bluetooth inquiry operation, for example, and sends out radio signals (inquiry signals) for causing portable information terminals located in the vicinity thereof to provide information about themselves. Once the communication unit 46 of the main terminal 4 and the communication units of the portable information terminals 5 have received the inquiry signals, they send out response signals including their own identification information 33a and the like to the in-vehicle terminal 3.

The communication unit 36 of the in-vehicle terminal 3 receives the response signals sent out front each portable information terminals. The communication unit 36 obtains a list of portable information terminals that are present in the vicinity thereof, by listing the identification information 33a included in the received response signals. When receiving the response signals, the measurement unit 361 measures electric field strengths of the response signals. The control unit 30 associates the electric field strengths measured by the measurement unit 361 with the list of portable information terminals obtained by the communication unit 36 (the list of the identification information 33a) and then keeps this information in the DRAM 32.

The main terminal identifying unit 301 retrieves each identification information 33a kept in the DRAM 32, from the occupant DB 33. Thereby, the identification information 33a kept in the DRAM 32 is categorized into the identification information 33a that has already been registered in the occupant DB 33 and the (unregistered) identification information 33a that has not been registered in the occupant DB 33. The main terminal identifying unit 301 further categorizes the identification information 33a that has already been registered in the occupant DB 33 into the identification information 33a of the main terminal 4 and the identification information 33a of the portable information terminals 5 which are not the main terminal 4, by referring to the values of the main terminal flags 33b. In other words, the main terminal identifying unit 301 identifies the main terminal 4 among the portable information terminals. Namely, at this point of time, the portable information terminals present in the vicinity of the main terminal identifying unit 301 are categorized into the main terminal 4, the registered portable information terminals 5, and the unregistered portable information terminals 5.

The control unit 30 establishes wireless communication with the main terminal 4. The control unit 30 transmits the electric field strength measured for the main terminal 4 which is kept in the DRAM 32 and the identification information 33a and electric field strengths of other portable information terminals 5 which are kept in the DRAM 32, via the established wireless communication to the main terminal 4.

The control unit 40 of the main terminal 4 keeps these information received by the communication unit 46 in the DRAM 42 of the main terminal 4. At this point of time, the following information are kept in the DRAM 42 of the main terminal 4.

(1) the electric field strength of the radio signal emitted from the main terminal 4, as measured by the in-vehicle terminal 3;

(2) the identification information 33a of the registered portable information terminals 5 detected by the in-vehicle terminal 3;

(3) the electric field strengths corresponding to the above-described information (2) detected by the in-vehicle terminal 3;

(4) the identification information 33a of the unregistered portable information terminals 5 detected by the in-vehicle terminal 3; and (5) the electric field strengths corresponding to the above-described information (4) detected by the in-vehicle terminal 3.

First, the position determining unit 401 of the main terminal 4 determines a relative positional relationship between the in-vehicle terminal 3 and the main terminal 4 on the basis of the above-described information (1). In the following description, it is assumed that the in-vehicle terminal 3, the main terminal 4, and the portable information terminals 5 are located in a plane that is parallel to a floor of the vehicle 2 and is at a predetermined height, and the positional relationship in this plane will be considered. In other words, in the following description, positional relationships in a vertical direction of the in-vehicle terminal 3, the main terminal 4, and the portable information terminals 5 will not be taken into consideration.

Figure 5:
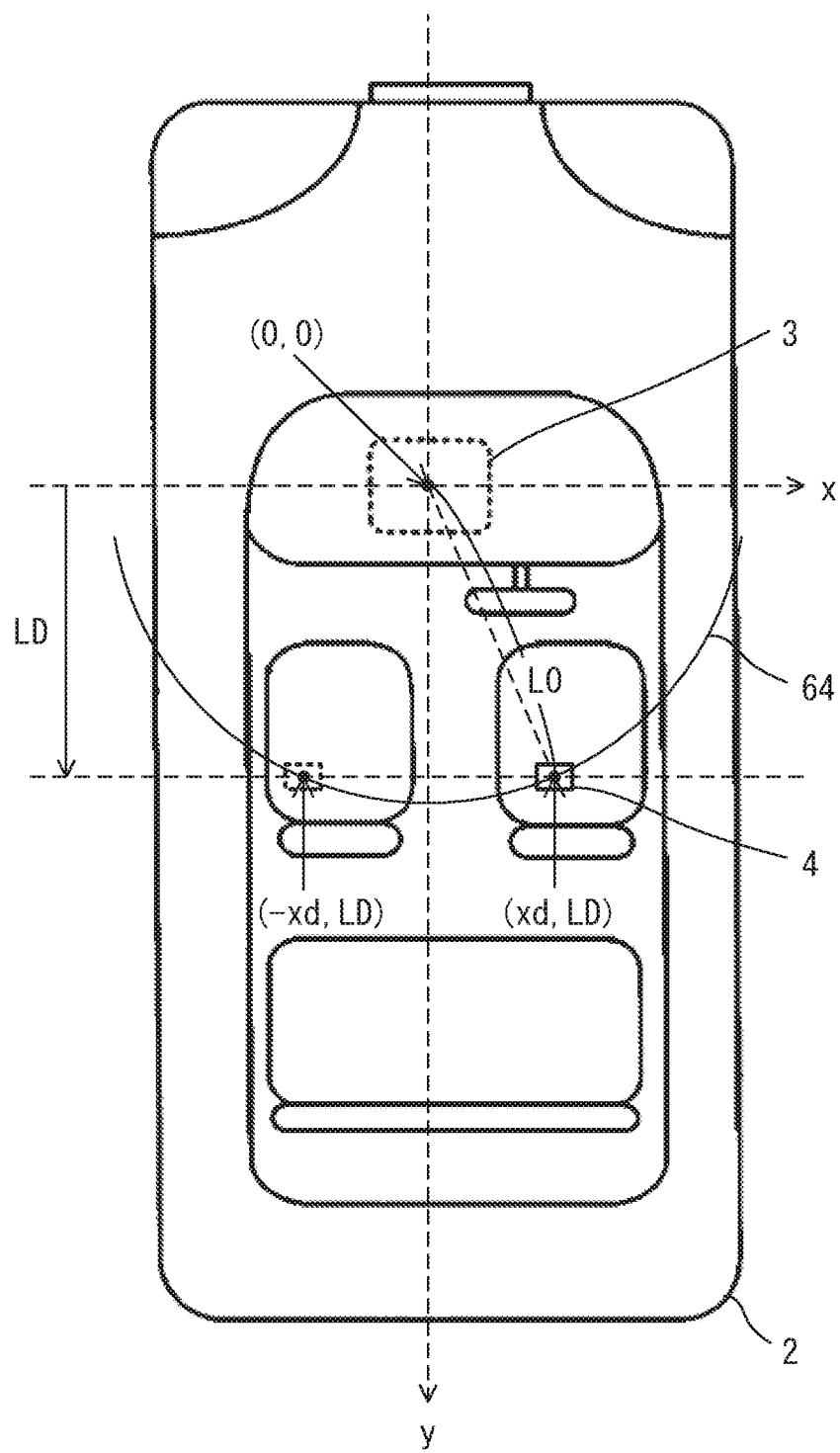
FIG. 5 is a schematic view explaining a method of determining a relative positional relationship between the in-vehicle terminal and the main terminal.

FIG. 5 is a schematic view explaining a method of determining the relative positional relationship between the in-vehicle terminal 3 and the main terminal 4. In FIG. 5, a two-dimensional coordinate system is established, wherein the right direction of the vehicle 2 is the +x direction and the rear direction of the vehicle 2 is the +y direction. For convenience of explanation, the position of the in-vehicle terminal 3 will be set as an origin and represented by a coordinate (0, 0). The electric field strength of the radio signal attenuates in proportion to a distance. Therefore, the position determining unit 401 can determine a length L0 from the in-vehicle terminal 3 to the main terminal 4, from the above-described information (1). The main terminal 4 is located on a circumference of a circle 64 having a radius L0, with the coordinate (0, 0) being as its center. The position determining unit 401 considers that the main terminal 4 is present at a position apart from the origin (0, 0) by a predetermined distance LD in the rear direction of the vehicle 2. The predetermined distance LD is a distance that is determined on the basis of the position of a driver seat of the vehicle 2. At this point of time, the main terminal 4 should be located either at a coordinate (−xd, LD) or at a coordinate (xd, LD), as shown in FIG. 5. If the vehicle 2 is a right-hood-drive vehicle, the position determining unit 401 determines the coordinate (xd, LD) as the position of the main terminal 4. If the vehicle 2 is a LD left-hand-drive vehicle, the position determining unit 401 determines the coordinate (−xd, LD) as the position of the main terminal 4.

In the following description, the coordinate of the main terminal 4 determined here will be represented by (Xd, Yd).

It will be noted that the predetermined distance LD may be adjustable by the driver as desired. For example, if the driver seat is movable in a front-rear direction, the predetermined distance LD may vary depending on the position of the driver seat. The predetermined distance LD may vary also depending on the posture of the driver or a position where the main terminal 4 is carried. Because the driver can adjust the predetermined distance LD depending on the above-described situations, it is possible to determine the position of the main terminal 4 with a higher accuracy.

The position determining unit 401 determines the coordinate (Xd, Yd) of the main terminal 4 by means of the above-described process, with the coordinate of the in-vehicle terminal 3 being (0, 0). In other words, the position determining unit 401 determines the relative positional relationship between the in-vehicle terminal 3 and the main terminal 4. On the basis of the thus determined positional relationship, the position determining unit 401 then determines the position of each portable information terminal 5.

The position determining unit 401 causes the communication unit 46 to detect portable information terminals 5 located in the vicinity thereof. The communication unit 36 performs a Bluetooth inquiry operation, for example, and sends out radio signals (inquiry signals) for causing portable information terminals 5 located in the vicinity thereof to provide information about themselves. Once the communication units of the portable information terminals 5 have received the inquiry signals, they send out response signals including their own identification information 33a and the like to the main terminal 4.

The communication unit 46 of the main terminal 4 receives the response signals sent out from the portable information terminals 5. The communication unit 46 obtains a list of portable information terminals that are present in the vicinity thereof, by listing the identification information 33a included in the received response signals. When receiving the response signals, the measurement unit 461 measures electric field strengths of the response signals. The control unit 40 further associates the electric field strengths measured by the measurement unit 461 with the above-described information (2), (4) received from the in-vehicle terminal 3 and then keeps this information in the DRAM 42.

At this point of time, the following information (6) to (8) are kept in the DRAM 42 of the main terminal 4, in addition to the information (1) to (5).

(6) the position (coordinate) of the main terminal 4 determined by the position determining unit 401;

(7) the electric field strengths corresponding to the above-described information (2) detected by the main terminal 4; and (8) the electric field strengths corresponding to the above-described information (4) detected by the main terminal 4.

On the basis of the above-described information (3), (6) and (7), the position determining unit 401 determines the position of each registered portable information terminal 5. Similarly, on the basis of the above-described information (5), (6) and (8), the position determining unit 401 then determines the position of each unregistered portable information terminal 5.

Figure 6:
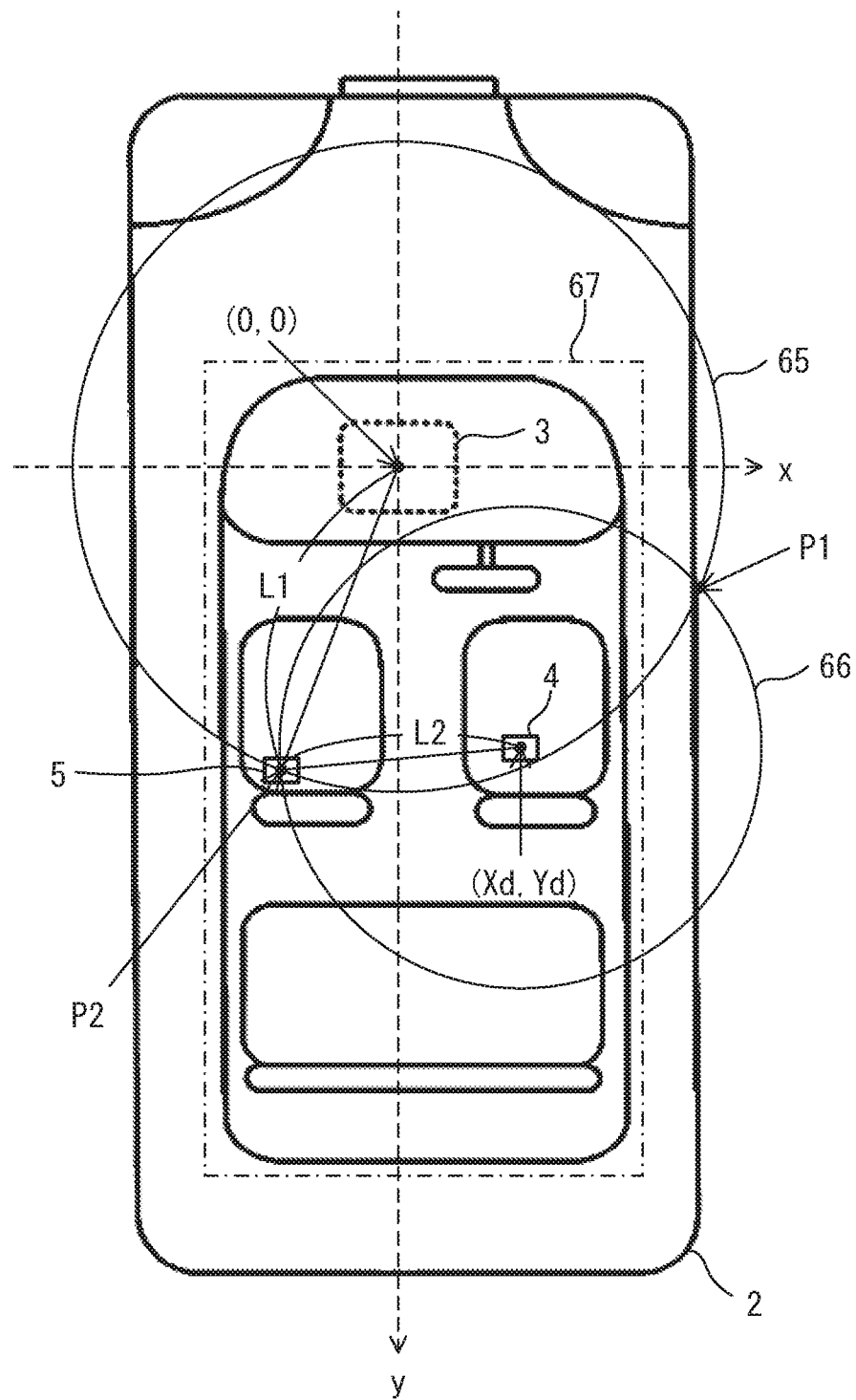
FIG. 6 is a schematic view explaining a method of determining positions of the portable information terminals.

FIG. 6 is a schematic view explaining a method of determining a position of a portable information terminal 5. The electric field strength of the radio signal attenuates in proportion to a distance. Therefore, the position determining unit 401 can determine a length L1 from the in-vehicle terminal 3 to the portable information terminal 5, from the above-described information (3) or (5). The portable information terminal 5 is located on a circumference of a circle 65 having a radius L1, with the coordinate (0, 0) being as its center. Further, the position determining unit 401 can determine a length L2 from the main terminal 4 to the portable information terminal 5, from the above-described information (7) or (8). The portable information terminal 5 is located on a circumference of a circle 66 having a radius L2, with the coordinate (Xd, Yd) being as its center. Thus, it is found that the portable information terminal 5 is located at either of intersection points P1, P2 of two circles 65, 66.

The position determining unit 401 determines at which intersection point P1 or P2 the portable information terminal 5 is present, on the basis of a predetermined effective range 67. The predetermined effective range 67 is a range in which the occupants may be present, wherein the range is determined on the basis of dimensions of the vehicle interior of the vehicle 2. Considering the circle 65 having a radius L1 and the circle 66 having a radius L2, one of two intersection points P1, P2 of the circles 65, 66 may be located outside of the vehicle interior of the vehicle 2 as illustrated in FIG. 6. Because the occupant is obviously in the vehicle interior of the vehicle 2, the position determining unit 401 excludes the intersection point P1 among the two intersection points P1, P2 that is out of the effective range 67, from candidates for the position of the portable information terminal 5. In the example of FIG. 6, the position determining unit 401 determines the intersection point P2 that is located within the effective range 67 as the position of the portable information terminal 5.

The position determining unit 401 determines the position of each portable information terminal 5 that is present in the vicinity thereof, in accordance with the above-described procedure. The control unit 40 transmits positional information indicating the position of the main terminal 4 and positional information indicating the positions of portable information terminals 5, in association with the identification information 33a, to the in-vehicle terminal 3. The control unit 30 of the in-vehicle terminal 3 displays the positions of the main terminal 4 and the portable information terminals 5 on the display unit 34, on the basis of the received positional information.

It will be noted that if both of the two intersection points P1, P2 are within the effective range 67, the position determining unit 401 handles the two points as the position of the portable information terminal 5. The control unit 30 displays the unregistered-terminal icons 62 or the registered-terminal icons 61 at both positions. On the other hand, if both of the two intersection points P1, P2 are out of the effective range 67, the position determining unit 401 determines that the portable information terminal 5 is located outside of the vehicle interior and ignores this portable information terminal 5.

FIGS. 7A to 7C are flowcharts of the terminal position determining process. FIG. 7A shows a process executed by the in-vehicle terminal 3. FIG. 7B shows a process executed by the main terminal 4. FIG. 7C shows a process executed by the portable information terminal 5.

The process executed by the in-vehicle terminal 3 as shown in FIG. 7A will be described. In step S105, the communication unit 36 sends out inquiry signals to the main terminal 4 and the portable information terminals 5 located in the vicinity thereof. In step S110, the communication unit 36 receives response signals sent out from the main terminal 4 and the portable information terminals 5 located in the vicinity thereof. In step S115, the measurement unit 361 measures an electric field strength for each received response signal. In step S120, the control unit 30 looks up the occupant DB 33 and categorizes sources of the response signals into the main terminal 4, the registered portable information terminals 5, and the unregistered portable information terminals 5. In step S125, the communication unit 36 establishes wireless communication with the main terminal 4. In step S130, the communication unit 36 transmits the identification information 33a included in the response signals received in step S110 and the electric field strength for each terminal measured in step S115 to the main terminal 4. In step S160, the communication unit 36 receives positional information for each terminal transmitted from the main terminal 4.

Thus, the control program executed by the control unit 30 of the in-vehicle terminal 3 includes: a measuring step of measuring electric field strengths of radio waves for wireless communication emitted from portable information terminals located in the vicinity thereof; a main terminal identifying step of identifying a main terminal 4 among the portable information terminals; and a communicating step of establishing wireless communication with the identified main terminal 4 and transmitting electric field strengths for other portable information terminals 5 than the main terminal 4 measured by the measuring step, via the wireless communication to the main terminal 4.

The process executed by the main terminal 4 as shown in FIG. 7B will be described. In step S205, the communication unit 46 receives the inquiry signal sent out from the in-vehicle terminal 3. In step S210, the communication unit 46 sends out a response signal including the identification information 33a of the main terminal 4 to the in-vehicle terminal 3. In step S225, the communication unit 46 establishes wireless communication with the in-vehicle terminal 3. In step S230, the communication unit 46 receives sets of the identification information 33a and the electric field strengths of the portable information terminals 5, which are transmitted from the in-vehicle terminal 3. In step S235, the position determining unit 401 determines a relative positional relationship between the in-vehicle terminal 3 and the main terminal 4, on the basis of the electric field strength of the response signal sent out from the main terminal 4, as measured by the in-vehicle terminal 3. In other words, the position determining unit 401 determines the coordinate (Xd, Yd) of the main terminal 4, with the coordinate of the in-vehicle terminal 3 being (0, 0). In step S240, the communication unit 46 sends out inquiry signals to the portable information terminals 5 located in the vicinity thereof. In step S245, the communication unit 46 receives response signals sent out from the portable information terminals 5 located in the vicinity thereof. In step S250, the measurement unit 461 measures an electric field strength for each received response signal. In step S255, the position determining unit 401 determines the position of each portable information terminal 5, in accordance with the procedure explained in FIG. 6. In step S260, the communication unit 46 transmits positional information indicating the position of the identified main terminal 4 and the positions of the portable information terminals 5 to the in-vehicle terminal 3.

The process executed by the portable information terminal 5 as shown in FIG. 7C will be described. In step S305, the communication unit of the portable information terminal 5 receives the inquiry signal sent out from the in-vehicle terminal 3. In step S310, the communication unit of the portable information terminal 5 sends out a response signal including the identification information 33a of the portable information terminal 5 to the in-vehicle terminal 3. In step S340, the communication unit of the portable information terminal 5 receives the inquiry signal sent out from the main terminal 4. In step S345, the communication unit of the portable information terminal 5 sends out a response signal including the identification information 33a of the portable information terminal 5 to the main terminal 4.

According to the above-described embodiment, the following operational advantages can be obtained.

(1) The measurement unit 361 measures electric field strengths of radio waves for wireless communication emitted from portable information terminals located in the vicinity thereof. The main terminal identifying unit 301 identifies the main terminal 4 among the portable information terminals. The communication unit 36 establishes wireless communication with the identified main terminal 4 and transmits electric field strengths (first electric field strengths) for other portable information terminals 5 than the main terminal 4 measured by the measurement unit 361, via the wireless communication to the main terminal 4. In this way, it is possible that main terminal 4 detects positions of the occupants, without adding any dedicated components to the main terminal 4. Furthermore, it is possible that the in-vehicle terminal 3 knows positions of the occupants, without adding any dedicated components to the in-vehicle terminal 3.

(2) The measurement unit 361 measures the electric field strength of the radio wave emitted from the main terminal 4 when the communication unit 36 establishes the wireless communication with the main terminal 4. In this way, the electric field strength measured in the exchange of signals in the process of establishing the wireless can be used as it is, and it is thus not necessary to measure the electric field strength again, which results in an increase in the operating speed. Furthermore, because the communication unit 36 is configured to integrate the measurement unit 361 therein, it is not necessary to additionally connect any special components for measuring the electric field strength to the control unit 30 or the like, which results in a reduction in the number of parts.

(3) The communication unit 36 transmits an electric field strength (second electric field strength) for the main terminal 4 measured by the measurement unit 361, via the established wireless communication to the main terminal 4. In this way, the electric field strength measured in the exchange of signals in the process of establishing the wireless communication can be used as it is, and it is thus not necessary to measure the electric field strength again, which results in an increase in the operating speed.

(4) The communication unit 36 receives positional information of other information terminals 5 from the main terminal 4 via the wireless communication. In this way, it is possible to determine positions of the portable information terminals 5 and use the information for display on the display unit 34 or the like.

(5) The display unit 34 displays the positions of other portable information terminals 5, on the basis of the positional information of other portable information terminals 5 received by the communication unit 36. In this way, the registration of the portable information terminals 5 into the occupant DB is facilitated. This is because it can be easily determine who owns each portable information terminal 5 on the basis of the position of the portable information terminal 5 displayed on the display unit 34, even if a plurality of occupants carry the portable information terminals 5, for example.

Second Embodiment

In the first embodiment described above, the main terminal 4 has the position determining unit 401 that determines the positions of the portable information terminals 5. In other words, the main terminal 4 determines the position of each portable information terminal 5. In a second embodiment described below, the in-vehicle terminal 1003 determines the position of each portable information terminal 5.

Figure 8:
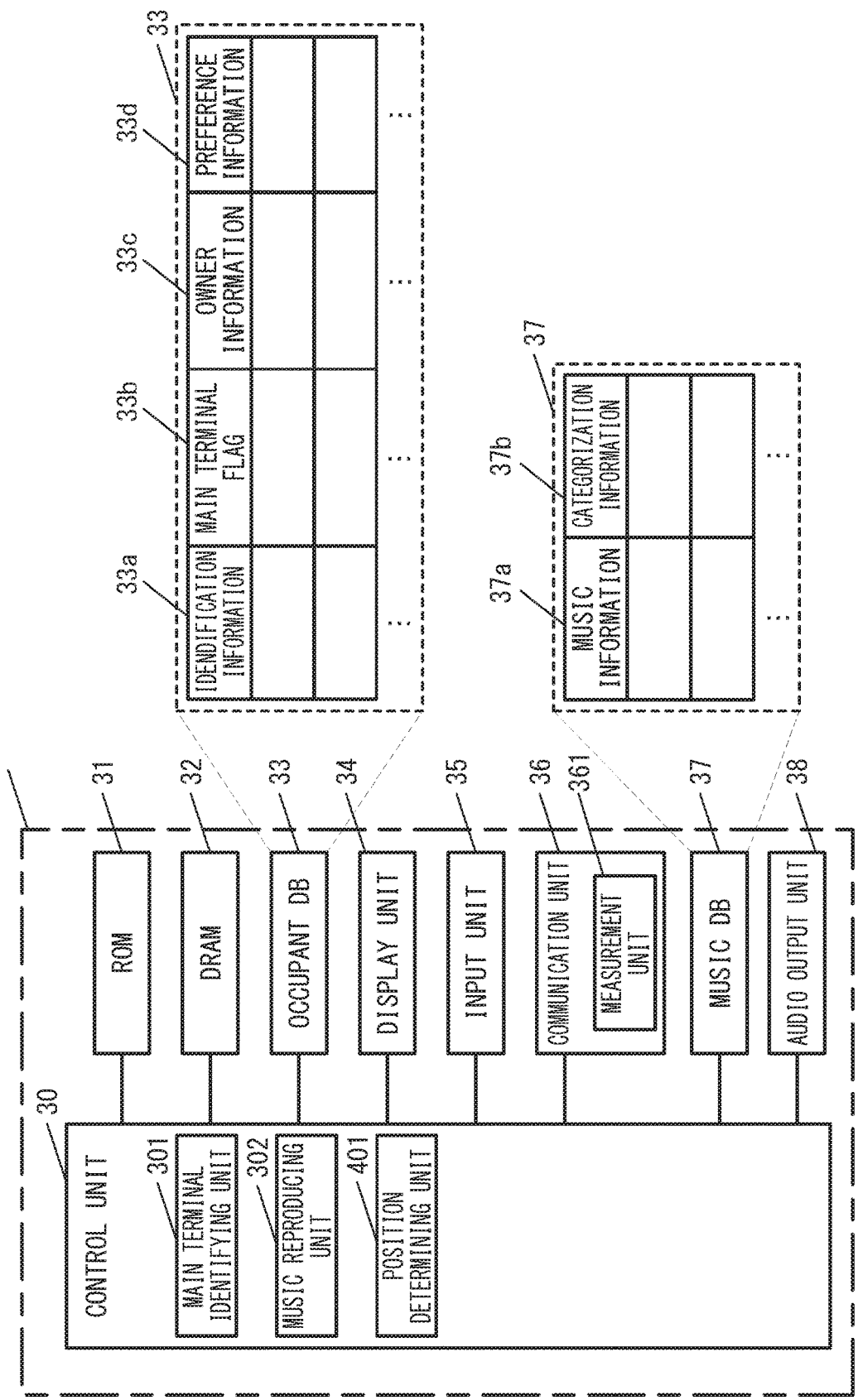
FIG. 8 is a block diagram schematically showing a configuration of the in-vehicle terminal.

FIG. 8 is a block diagram schematically showing a configuration of the in-vehicle terminal 1003. The in-vehicle terminal 1003 is different from the in-vehicle terminal 3 shown in FIG. 2 in that the control unit 30 has the position determining unit 401.

Figure 9:
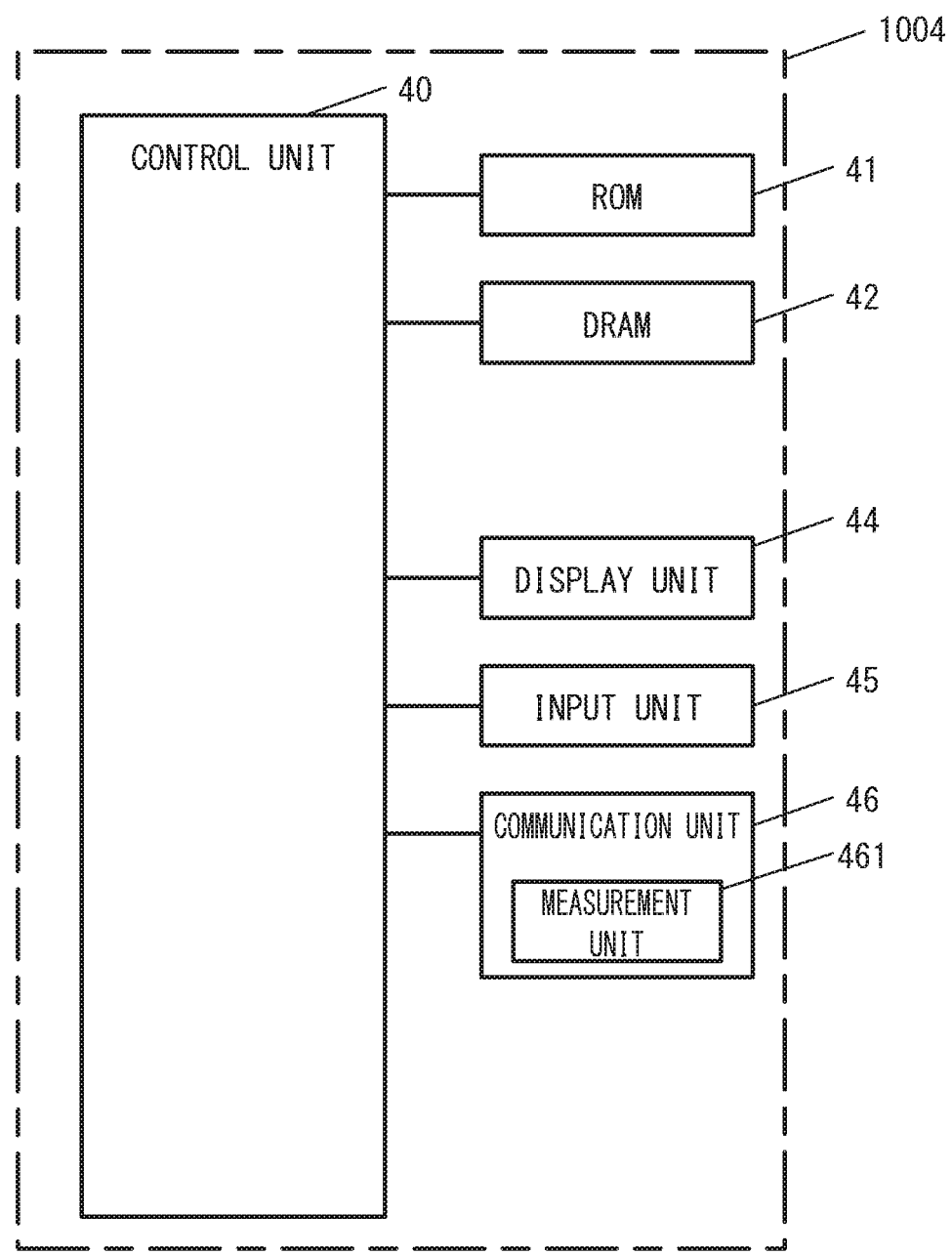
FIG. 9 is a block diagram schematically showing a configuration of the main terminal.

FIG. 9 is a block diagram schematically showing a configuration of the main terminal 1004. The main terminal 1004 is different from the main terminal 4 shown in FIG. 3 in that the control unit 40 does not have any position determining unit.

Figure 10:
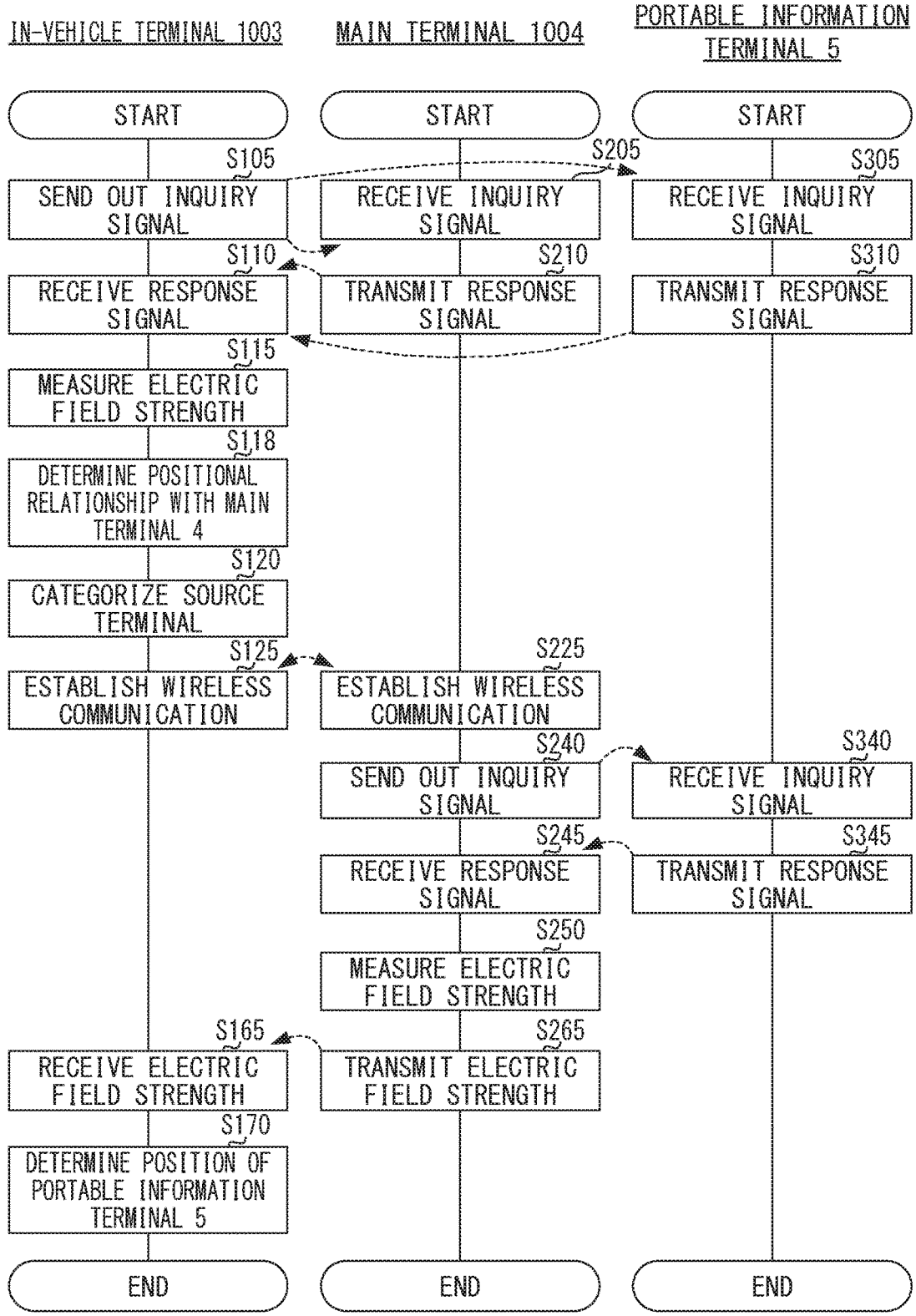
FIGS. 10A to 10C are flowcharts of a terminal position determining process.

FIGS. 10A to 10C are flowcharts of a terminal position determining process. It will be noted that the same processes as in the terminal position determining process (FIGS. 7A to 7C) according to the first embodiment are denoted by the same reference numerals as in the first embodiment. FIG. 10A shows a process executed by the in-vehicle terminal 1003. FIG. 10B shows a process executed by the main terminal 1004. FIG. 10C shows a process executed by the portable information terminal 5.

The process executed by the in-vehicle terminal 1003 as shown in FIG. 10A will be described. In step S105, the communication unit 36 sends out inquiry signals to the main terminal 4 and the portable information terminals 5 located in the vicinity thereof. In step S110, the communication unit 36 receives response signals sent out from the main terminal 4 and the portable information terminals 5 located in the vicinity thereof. In step S115, the measurement unit 361 measures an electric field strength for each received response signal. The electric field strength corresponding to each of the main terminal 1004 and the portable information terminals 5 measured here is kept by the DRAM 32. In step S118, the position determining unit 401 determines a relative positional relationship between the in-vehicle terminal 1003 and the main terminal 1004, on the basis of the electric field strength of the response signal sent out from the main terminal 1004, as measured by the in-vehicle terminal 1003. In other words, the position determining unit 401 determines the coordinate (Xd, Yd) of the main terminal 1004, with the coordinate of the in-vehicle terminal 1003 being (0, 0). In step S120, the control unit 30 looks up the occupant DB 33 and categorizes sources of the response signals into the main terminal 1004, the registered portable information terminals 5, and the unregistered portable information terminals 5. In step S125, the communication unit 36 establishes wireless communication with the main terminal 1004. In step S165, the communication unit 36 receives sets of the identification information 33a and the electric field strengths of the portable information terminals 5, which are transmitted from the main terminal 1004. In step S170, the position determining unit 401 determines the position of each portable information terminal 5, in accordance with the procedure explained in FIG. 6.

Thus, the control program executed by the control unit 30 of the in-vehicle terminal 1003 includes: a measuring step of measuring electric field strengths of radio waves for wireless communication emitted from portable information terminals located in the vicinity thereof; a main terminal identifying step of identifying a main terminal 1004 among the portable information terminals; a keeping step of keeping electric field strengths for other portable information terminals 5 than the identified main terminal 1004 measured by the measuring step; and a communication step of establishing wireless communication with the main terminal 1004 and receiving the electric field strengths for other information terminals 5 measured by the main terminal 1004, from the main terminal 1004 via the wireless communication.

A process executed by the main terminal 1004 as shown in FIG. 10B will be described. In step S205, the communication unit 46 receives the inquiry signal sent out from the in-vehicle terminal 1003. In step S210, the communication unit 46 sends out a response signal including the identification information 33*a* of the main terminal 1004 to the in-vehicle terminal 1003. In step S225, the communication unit 46 establishes wireless communication with the in-vehicle terminal 1003. In step S240, the communication unit 46 sends out inquiry signals to portable information terminals 5 located in the vicinity thereof. In step S245, the communication unit 46 receives the response signals sent out from the portable information terminals 5 located in the vicinity thereof. In step S250, the measurement unit 461 measures an electric field strength for each received response signal. In step S265, the communication unit 46 transmits the identification information 33*a* included in the response signals received in step S245 and the electric field strength for each terminal measured in step S250 to the in-vehicle terminal 1003.

The process executed by the portable information terminal 5 as shown in FIG. 10C will be described. In step S305, the communication unit of the portable information terminal 5 receives the inquiry signal sent out from the in-vehicle terminal 1003. In step S310, the communication unit of the portable information terminal 5 sends out a response signal including the identification information 33*a* of the portable information terminal 5 to the in-vehicle terminal 1003. In step S340, the communication unit of the portable information terminal 5 receives the inquiry signal sent out from the main terminal 1004. In step S345, the communication unit of the portable information terminal 5 sends out a response signal including the identification information 33*a* of the portable information terminal 5 to the main terminal 1004.

According to the above-described embodiment, the following operational advantages can be obtained.

(6) The measurement unit 361 measures electric field strengths of radio waves for wireless communication emitted from portable information terminals located in the vicinity thereof. The main terminal identifying unit 301 identifies the main terminal 1004 among the portable information terminals. The DRAM 32 serves as a keeping unit that keeps electric field strengths (first electric field strengths) for other portable information terminals 5 than the identified main terminal 4 measured by the measurement unit 361. The communication unit 36 establishes wireless communication with the main terminal 1004 and receives electric field strengths (second electric field strengths) for other portable information terminals 5 measured by the main terminal 1004, from the main terminal 1004 via the wireless communication. In this way, it is possible that main terminal 1004 detects positions of the occupants, without adding any dedicated components to the main terminal 1004. Furthermore, it is possible that the in-vehicle terminal 1003 knows positions of the occupants, without adding any dedicated components to the in-vehicle terminal 1003.

(7) The measurement unit 361 measures the electric field strength of the radio wave emitted from the main terminal 1004 when the communication unit 36 establishes the wireless communication with the main terminal 1004. In this way, the electric field strength measured in the exchange of signals in the process of establishing the wireless communication can be used as it is, and it is not necessary to measure the electric field strengths again, which results in an increase in the operating speed. Furthermore, because the communication unit 36 is configured to integrate the measurement unit 361 therein, it is not necessary to separately connect any special components for measuring the electric field strength to the control unit 30 or the like, which results in a reduction in the number of parts.

(8) The DRAM 32 further keeps an electric field strength (third electric field strength) for the main terminal 1004 measured by the measurement unit 361. The position determining unit 401 determines a relative positional relationship between the in-vehicle terminal 1003 and the main terminal 1004 on the basis of the third electric field strength. Because it is estimated that the position of the main terminal 1004 is within a limited range in the vicinity of the driver seat, the position of the main terminal 1004 which can be easily determined only with minimum required information is determined first, so that the positions of the portable information terminals 5 can then be easily determined.

(9) The position determining unit 401 determines positions of other portable information terminals 5 on the basis of the positional relationship between the in-vehicle terminal 1003 and the main terminal 1004 and on the basis of the first and second electric field strengths kept in the DRAM 32. In this way, it is possible to determine positions of the portable information terminals 5 with a high accuracy.

(10) If there are a plurality of candidates for the position of each of other portable information terminals 5, the position determining unit 401 determines the position of the portable information terminal 5 by excluding candidates that are present out of the effective range 67. In this way, it is possible to determine positions of the portable information terminals 5 with a high accuracy.

(11) The display unit 34 displays the positions of other portable information terminals 5 determined by the position determining unit 401. In this way, the registration of the portable information terminals 5 into the occupant DB is facilitated.

The following variations are also contemplated within the scope of the present invention and one or more of the variations may be combined with the above-described embodiments.

(First Variation)

In each embodiment described above, the positions of the portable information terminals 5 determined by the position determining unit 401 are used for display on the display unit 34. The positions of the portable information terminals 5 determined by the position determining unit 401 may be used for other purposes. For example, the positional information may be used for preventing the occupants to leave the portable information terminals 5 behind in the vehicle 2 when they get off the vehicle 2, with an alarm or the like. Moreover, air conditioning is turned to be active only in places where the portable information terminals 5 are present, while air conditioning is inactive in other places, so that an energy-saving air conditioning feature can be achieved.

(Second Variation)

In each embodiment described above, the music reproducing feature that provides music optimized for the occupants has been described. However, it is also possible to utilize the information of the occupants for other features. For example, information about whether the occupant is sensitive to heat or cold has been stored in the occupant DB 33 as preference information 33*d*. The control unit 30 changes an air volume or temperature setting of an air conditioner in accordance with the preference information 33d, so that an air conditioning feature that provides air conditioning optimized for the occupants can be implemented.

(Third Variation)

The position determining unit 401 may determine a positional relationship between the in-vehicle terminal 3 (or the in-vehicle terminal 1003; the same shall apply hereinafter) and the main terminal 4 (or the main terminal 1004; the same shall apply hereinafter), on the basis of the electric field strength of the radio signal emitted from the in-vehicle terminal 3, as measured by the main terminal 4.

Figure 11:
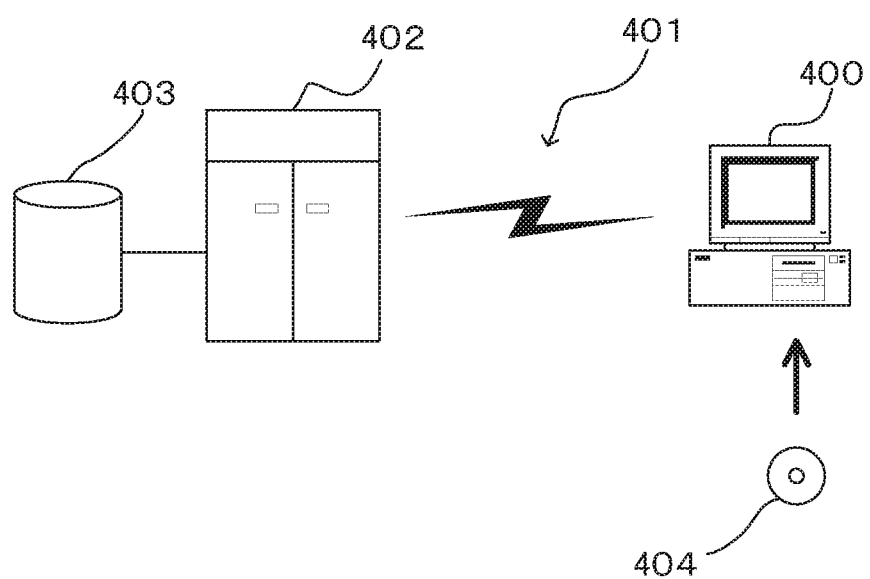
FIG. 11 illustrate that the programs are provided through a recording medium or data signal.

In the case that the programs described above are applied to a personal computer, etc., the programs described above can be provided through a recording medium as a CD-ROM, or data signal as the Internet, as shown in FIG. 11. A personal computer 400 may be provided with the programs through a CD-ROM 404. The personal computer 400 has a connect function to a communication line 401. A computer 402, which is a server computer that provides the programs described above, may store them on a recording medium such as a hard disk 403. The communication line 401 is a communication line such as the Internet or a personal computer communication, or a leased line, etc. The computer 402 may read out the programs using the hard disk 403, send them to the personal computer 400 through the communication line 401. In other words, the programs may be embodied on a carrier wave as a data signal, and sent through the communication line 401. Thus, the programs can be provided as a computer-readable computer program product in a variety of forms such as recording medium, a carrier wave, etc.

According to the embodiments and variations of the present invention described above, positions of occupants can be detected without adding any dedicated components.

Although a variety of embodiments and variations have been described above, the present invention is not limited to the contents of the embodiments and variations. Other aspects conceivable within the scope of the technical idea of the present invention are encompassed within the scope of the present invention.

What is claimed is:

1. An in-vehicle terminal, comprising:
a CPU configured to:
measure electric field strengths of radio waves for wireless communication emitted from information terminals located in a vicinity thereof;
identify a predetermined main terminal among the information terminals; and
establish wireless communication with the identified main terminal and transmit strength information of a first electric field for another information terminal than the main terminal measured by the CPU, via the wireless communication to the main terminal;
wherein the CPU measures an electric field strength as one of the electric field strengths of a radio wave emitted from the main terminal when the CPU establishes the wireless communication;
wherein the CPU transmits strength information of a second electric field for the main terminal measured by the CPU, via the wireless communication to the main terminal; and
wherein the CPU receives positional information of the other information terminal calculated by the main terminal, from the main terminal via the wireless communication.

2. The in-vehicle terminal according to claim 1, wherein:
the CPU displays a position of the other information terminal, based on the receipt of positional information of the other information terminal received by the CPU.

3. An in-vehicle terminal, comprising:
a CPU configured to:
measure electric field strengths of radio waves for wireless communication emitted from information terminals located in a vicinity thereof;
identify a predetermined main terminal among the information terminals;
keep strength information of a first electric field for another portable information terminal than the identified main terminal measured by the CPU; and
establish wireless communication with the main terminal and receive strength information of a second electric field for the other information terminal measured by the main terminal, from the main terminal via the wireless communication;
wherein the CPU measures, as one of the electric field strengths, an electric field strength of a radio wave emitted from the main terminal when the CPU establishes the wireless communication;
wherein the CPU keeps strength information of a third electric field for the main terminal measured by the CPU, and the CPU determines a positional relationship between the in-vehicle terminal and the main terminal based on the strength information of the third electric field;
wherein the CPU determines a position of the other information terminal based on the positional relationship, the strength information of the first electric field, and the second electric field; and
wherein if there are a plurality of candidates for the position of the other information terminal determined based on the positional relationship, the strength information of the first electric field, and the strength information of the second electric field, the CPU determines the position of the other information terminal by excluding candidates that are present out of a predetermined range.

4. The in-vehicle terminal according to claim 3, wherein:
the CPU displays the position of the other information terminal determined by the CPU.

5. A non-transitory computer-readable recording medium having a program to be executed by a computer, the program comprising:
a measuring step of measuring electric field strengths of radio waves for wireless communication emitted from information terminals located in a vicinity thereof;
a main terminal identifying step of identifying a predetermined main terminal among the information terminals;
a keeping step of keeping strength information of a first electric field for another portable information terminal than the identified main terminal measured in the measuring step; and
a communication step of establishing wireless communication with the main terminal and receiving strength information of a second electric field for the other information terminal measured by the main terminal, from the main terminal via the wireless communication;
wherein in the measuring step, one of the electric field strengths is an electric field strength of a radio wave emitted from the main terminal that is measured at least when establishing the wireless communication;

wherein in the keeping step, strength information of a third electric field for the main terminal measured in the measuring step is further kept;

the program further comprises a position determining step of determining a positional relationship between an in-vehicle terminal and the main terminal based on the strength information of the third electric field;

wherein, in the position determining step, a position of the other information terminal is determined based on the positional relationship, the strength information of the first electric field, and the strength information of the second electric field; and wherein, in the position determining step, if there are a plurality of candidates for the position of the other information terminal determined based on the positional relationship, the strength information of the first electric field, and the strength information of the second electric field, the position of the other information terminal is determined by excluding candidates that are present out of a predetermined range.

6. The non-transitory computer-readable recording medium according to claim 5, wherein;

the program further comprises a display step of displaying the position of the other information terminal determined in the position determining step on a display device.

* * * * *